United States Patent [19]
Honda et al.

[11] Patent Number: 5,626,186
[45] Date of Patent: May 6, 1997

[54] AIR CONDITIONING APPARATUS FOR VEHICLES

[75] Inventors: Yuji Honda; Tomotsugu Terada, both of Okazaki; Katsuhiko Samukawa, Obu, all of Japan

[73] Assignee: Nippondenso Co., Ltd., Kariya, Japan

[21] Appl. No.: 406,342

[22] Filed: Mar. 17, 1995

[30] Foreign Application Priority Data

Mar. 17, 1994 [JP] Japan ................................. 6-046878

[51] Int. Cl.⁶ .................................................. B60H 3/00
[52] U.S. Cl. ........................ 165/43; 236/91 C; 236/91 F
[58] Field of Search ....................... 165/42, 43; 236/91 C, 236/91 F

[56] References Cited

U.S. PATENT DOCUMENTS

| | | |
|---|---|---|
| 4,417,618 | 11/1983 | Yoshimi et al. |
| 4,966,012 | 10/1990 | Iida ................................ 236/91 C |
| 5,152,335 | 10/1992 | Doi et al. ........................ 236/91 F |
| 5,186,682 | 2/1993 | Iida ................................ 236/91 C |
| 5,209,079 | 5/1993 | Kajino et al. ................... 236/91 C |
| 5,244,035 | 9/1993 | Iida et al. ....................... 236/91 F |
| 5,293,928 | 3/1994 | Iida et al. ....................... 236/91 F |
| 5,340,021 | 8/1994 | Kajino et al. ................... 236/91 C |
| 5,392,845 | 2/1995 | Honda et al. ................... 236/91 F |
| 5,427,313 | 6/1995 | Davis, Jr. et al. .............. 236/91 C |

FOREIGN PATENT DOCUMENTS

| | | | |
|---|---|---|---|
| 0043015 | 4/1981 | Japan | ........ 236/91 C |
| 0060713 | 5/1981 | Japan | ........ 236/91 C |
| 57-15009 | 1/1982 | Japan . | |
| 0107913 | 7/1982 | Japan | ........ 236/91 C |
| 0205219 | 12/1982 | Japan | ........ 236/91 C |

*Primary Examiner*—Edward K. Look
*Assistant Examiner*—Mark Sgantzos
*Attorney, Agent, or Firm*—Cushman, Darby & Cushman IP Group of Pillsbury Madison & Sutro LLP

[57] ABSTRACT

An air-conditioning apparatus for a passenger compartment of a vehicle includes an air duct having an inlet for receiving air to be conditioned, an air conditioner, and both face and foot outlets for supplying conditioned air into the passenger compartment. The air conditioner controls temperatures of the conditioned air from the face outlet and the foot outlet independently. The required temperature of the conditioned air from the independently controlled foot and face outlets is computed based on an inside air temperature, an outside air temperature, and the temperature set in the passenger compartment. A target supply air-temperature is computed in a bi-level mode based on an amount of sunlight in the passenger compartment, and is corrected as between the foot and face outlets such that air from the face outlet compensates for temperature differentials as between the passenger's feet and face due to sunlight, etc. In this way, a linear relationship is maintained between the correction amount of the temperature of the conditioned air and the temperature a passenger feels in the bi-level mode.

12 Claims, 11 Drawing Sheets

AMOUNT OF SUNLIGHT TSB (w/m²) FOR TARGET TEMPERATURE CORRECTION

TARGET TEMPERATURE TAV (°C) FOR FACE AIR OUTLET

AMOUNT OF SUNLIGHT Ts (w/m²)

AIRFLOW VA

LOW ⟷ HIGH
REQUIRED SUPPLY AIR TEMPERATURE TAO (°C)

AIR CONDITIONING APPARATUS FOR VEHICLES

CROSS REFERENCE TO RELATED APPLICATION

The present invention is based on and claims priority from Japanese application No 6-46878 filed on Mar. 17, 1994, the subject matter of which is incorporated herein by reference.

BACKGROUND OF THE INVENTION

1. Field of the Invention

The present invention relates to vehicle an air conditioning apparatus which is capable of independently controlling the temperature of air from each of a face air outlet and a foot air outlet.

2. Related Art

Conventionally, a vehicle air conditioner, such as automatic air conditioners, computes the required air supply temperature based on the inside and outside temperatures of a passenger compartment and the temperature set by a temperature setting device, and controls a supply airflow ratio of the face air outlet and the foot air outlet in accordance with the computed result. As a result of this control being performed, a foot mode wherein heated air is concentrately supplied from the foot air outlet to a compartment floor of the vehicle is set and operated when the outside temperature is low, such as in winter.

In a conventional vehicle air conditioner, a correction control is performed where the required supply air temperature (i.e., the temperature of conditioned air) is lowered because of an increased amount of sunlight.

In such an air conditioner, in case a comparatively strong amount of sunlight shines on the upper half of a passenger while the foot mode is selected, namely, in a case where it is preferable to soften a warm or hot feeling of the upper half of the passenger's body with conditioned air, the temperature of the conditioned air is lowered by the above correction control. However, the conditioned air from the foot air outlet hardly reaches the upper half of the passenger's body. So, there are problems in that it is impossible to soften the excessively warm or hot feeling caused by the insolation to the upper half of the body and an air conditioning feeling is deteriorated. Further, since the correction control lowers the temperature of the conditioned air, a lack of heating to the lower half of the passenger's body may be caused by the lowering of the temperature of warm air from the foot air outlet.

A solution to these problems can be seen from the air conditioner shown in Japanese Patent Application Laid-Open Publication No. Sho 57-15009, and its U.S. Pat. No. 4,417,618 therein, in the foot mode, when the amount of sunlight is equal to or more than a predetermined level, a bi-level mode is automatically set and operated. In that mode conditioned air is supplied from both the face air outlet and the foot air outlet, and thereby the warm or hot feeling of the upper half of the body of the passenger is alleviated and the air conditioning feeling is improved.

In most air-conditioners, an airflow ratio of the face air outlet and the foot air outlet in bi-level mode is generally set to 1:1. In the above described air conditioner, when the bi-level mode is set and operated after the amount of sunlight in the compartment becomes equal to or more than the predetermined level, a supply airflow quantity from the face air outlet increases quickly from zero. In such a case, however, an effective temperature to the upper half of the body of the passenger is lowered in accordance with the increase of the supply airflow, and it gives the passenger an unnecessary cool feeling because the temperature of the conditioned supply air is maintained the same. That is to say, it is hard to keep a linear relationship between a correction quantity conditioned air temperature based on the amount of insolated sunlight and a conditioned temperature which a passenger feels, and the air conditioning effect may be thereby deteriorated. Especially, it becomes particularly apparent, when a correction control lowers the temperature of conditioned air in accordance with the increased amount of sunlight into the compartment. In case that there is no mechanism for switching the foot mode to the bi-level mode when the amount of sunlight is equal to or more than the predetermined level and the correction control of the temperature of the conditioned air, it is also hard to keep the linear relationship between a correction quantity of conditioned air temperature by the amount of sunlight and the conditioned temperature which the passenger feels when supply airflow quantity from the face air outlet is controlled in accordance with the conditioned air temperature, and the air conditioning feeling may be deteriorated.

Even in case that the conditioned air temperature is adjusted by a temperature setting device in the hi-level mode in the conventional air conditioner, the air conditioning effect may be also deteriorated, because it is hard to keep a linear relationship between a variation quantity of the conditioned air in accordance with the set value and the conditioned temperature which the passenger feels.

SUMMARY OF THE INVENTION

The present invention is made in view of the above problems and an object of the present invention is to provide an air conditioning apparatus for a vechile which is capable of correcting the temperature of the conditioned air from a face air outlet in accordance with the amount of sunlight entering the compartment or the temperature set by the temperature setting device in the bi-level mode where conditioned air is supplied from both the face air supply outlet and the foot air outlet, thereby making it possible to improve the air conditioning effect.

According to a first aspect of the present invention, air conditioning apparatus for vehicles having a passenger compartment includes an air duct having an inlet for receiving air to be conditioned, and a face outlet and a foot outlet for supplying conditioned air into the compartment, the face and foot outlets being directed to an upper and a lower portion of the compartment, respectively, an air-conditioner for cooling and heating air received through the inlet of the air duct to supply conditioned air through the face air outlet and the foot air outlet, the air conditioner controlling temperatures of the conditioned air from the face outlet and the foot outlet independently, an inside air sensor for sensing an inside air temperature of the compartment, an outside air sensor for sensing an outside temperature of the compartment, a temperature setting unit for setting a temperature in the compartment, a computing device for computing a required temperature of conditioned air based on the inside air temperature, the outside air temperature and the temperature set by the temperature setting unit, an auxiliary computing device for computing a target supply air temperature in a bi-level mode where the conditioned air is supplied from both the face outlet and the foot air outlet based on an amount of sunlight entering the compartment, a correcting device for correcting the target supply air temperature for the face air outlet so that it is higher in accordance with an increase of the required temperature in the bi-level mode, and adjusting means for adjusting the temperature of the conditioned air from the face air outlet so that the temperature of the conditioned air from the face air outlet becomes the corrected target supply air temperature for the face air outlet.

It is possible that the auxiliary computing means computes a target supply air temperature in a bi-level mode where the conditioned air is supplied from both the face air outlet and the foot air outlet based on the temperature set by the temperature setting unit instead of the amount of sunlight entering the compartment.

According to a second aspect of the present invention, air conditioning apparatus for vehicles having a passenger compartment includes an air duct having an inlet for receiving air to be conditioned and face and foot outlets for supplying conditioned air into the compartment, the face and foot outlets being directed to an upper and a lower portion of the compartment, respectively, an air conditioner for cooling and heating air received through the inlet of the air duct to supply conditioned air through the face air outlet and the foot air outlet, the air conditioner controlling temperatures of the conditioned air from the face outlet and the foot outlet independently, airflow ratio control means for changing an airflow ratio of the conditioned air from the face air outlet and the foot air outlet in a bi-level mode where the conditioned air is supplied from both the face air outlet and the foot air outlet, an inside air sensor for sensing an inside air temperature of the compartment, an outside air sensor for sensing an outside temperature of the compartment, a temperature setting unit for setting a temperature in the compartment, a computing device for computing a required temperature of conditioned air based on the inside air temperature, the outside air temperature and the set temperature by the temperature setting unit, an auxiliary computing device for computing a target supply air temperature based on an amount of sunlight entering the compartment, an airflow ratio computing device for computing a target value of the airflow ratio in the bi-level mode based on the required supply air temperature and the amount of sunlight, a correcting device for correcting the target supply air temperature for the face air outlet so that it is higher in accordance with an increase of the target value of the airflow ratio of conditioned air from the foot outlet in the bi-level mode, and an adjusting device for adjusting the temperature of the conditioned air from the face air outlet so that the temperature of the conditioned air from the face air outlet becomes the corrected target supply air temperature for the face air outlet.

It is also possible that the auxiliary computing device computes a target supply air temperature in a bi-level mode where the conditioned air is supplied from both the face air outlet and the foot air outlet based on the temperature set by the temperature setting unit instead of the amount of sunlight entering the compartment.

BRIEF DESCRIPTION OF THE DRAWINGS

Other objects, features and characteristics of the present invention as well as the functions of related parts will become more clear from a study of the following detailed description, the appended claims, and the accompanying drawings:

DETAILED DESCRIPTION OF THE PREFERRED EMBODIMENTS

A first embodiment of the present invention is described below with respect to FIGS. 1–7.

Figure 2:
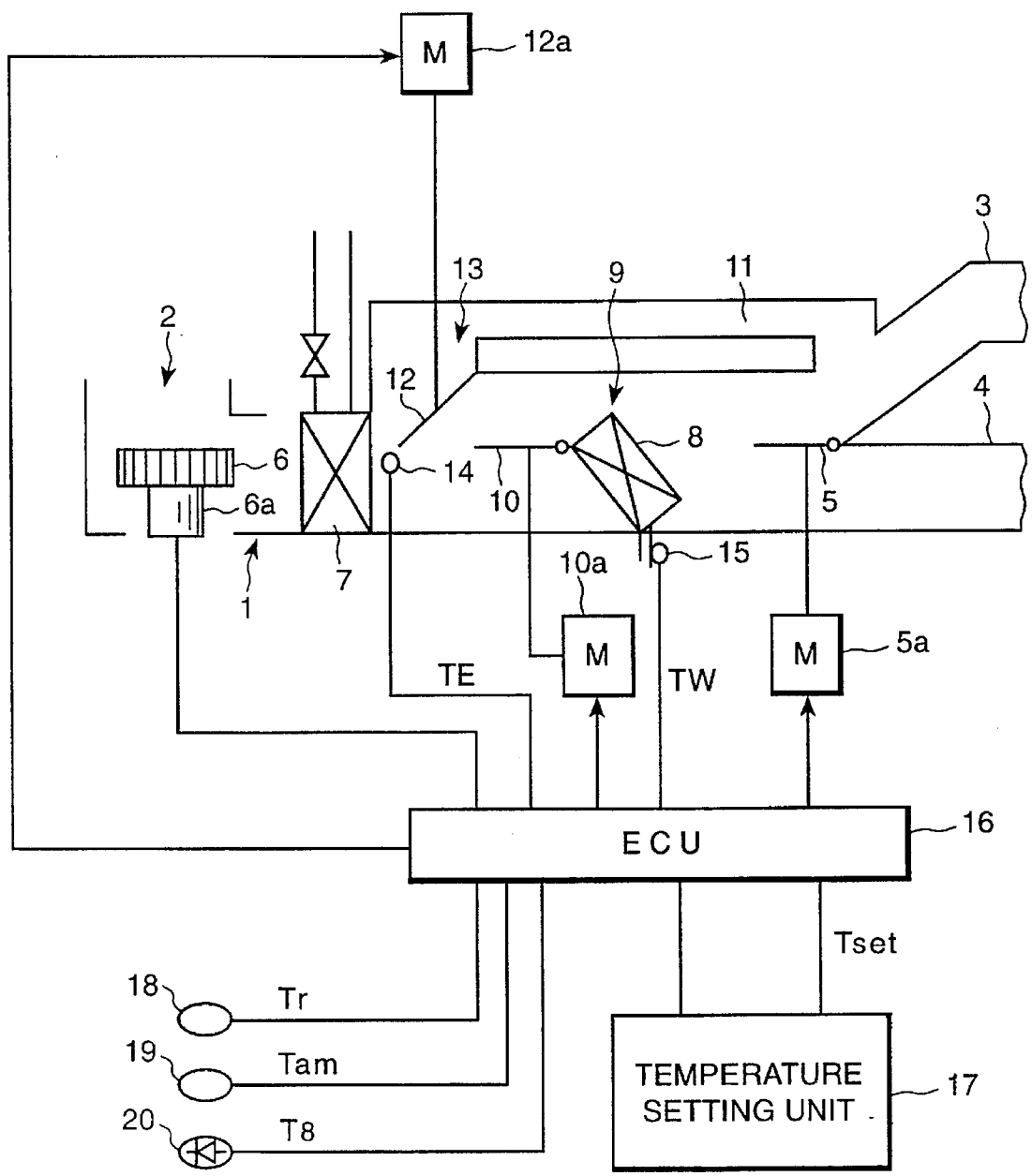
FIG. 2 is a diagrammatic view mechanically and electrically of the first embodiment according to the present invention.
Figure 3:
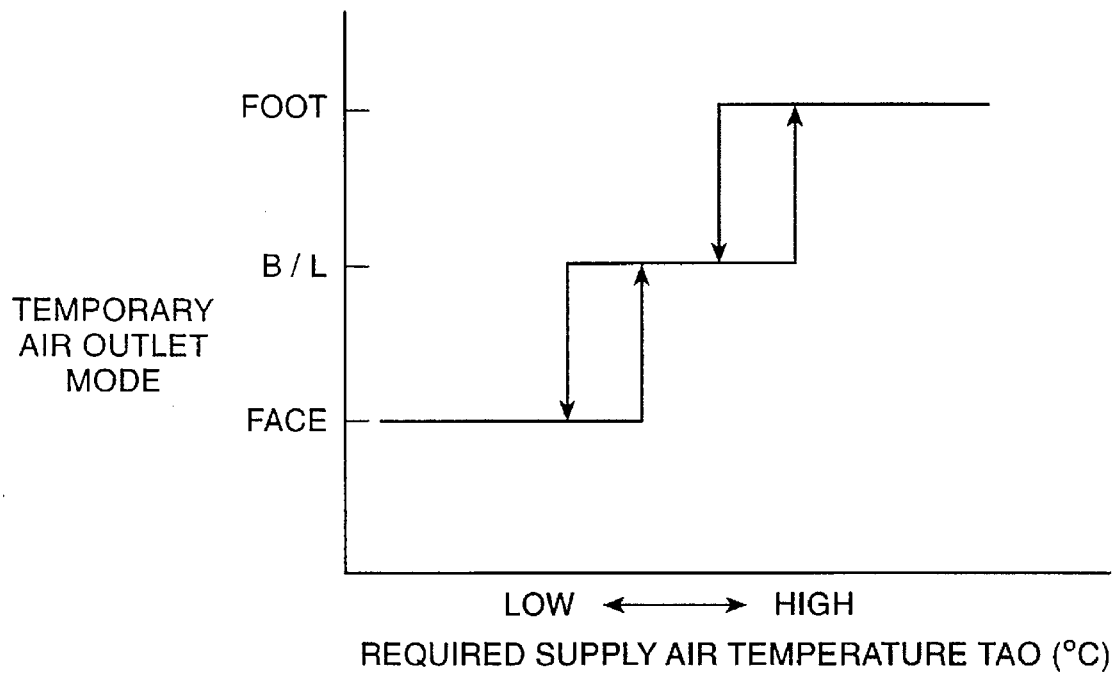
FIG. 3 is a graph showing a relationship between the required supply air temperature and the temporary air outlet mode according to the first embodiment.

FIG. 2 illustrates a mechanical and electrical structure of an air-conditioning apparatus which is capable of controlling the temperature of each of the air-conditioned airflows from a face air outlet and a foot air outlet independently. In that Figure, an air duct 1 includes an air inlet 2 communicating with an inside inlet (not shown) and an outside inlet (not shown) which are selectively opened and closed by an inside/outside air damper (not shown) at an upstream side. Air duct 1 also includes a face air outlet duct 3 communicating with a face air outlet (not shown) and a foot supply duct 4 communicating with a foot air outlet (not shown) at a downstream side. At a forking portion of these ducts 3 and 4, means for adjusting a ratio of airflow flowing into these ducts 3 and 4, such as a plate-like air outlet switching damper 5 is disposed.

In air duct 1 between a downstream side of air inlet 2 and an upstream of air outlet switching damper 5, a blower 6 as a ventilator, an evaporator 7 for a refrigeration cycle, and a heating unit 8 for circulating cooling water for an engine are disposed in that order. Especially, heating unit 8 is disposed to form a bypass passage 9 for an air mixture at a side thereof. Disposed at an upstream side of heating unit 8 is an adjusting device such as a plate-like air mix damper 10, for adjusting a ratio of airflow flowing through heating unit 8 and bypass passage 9 for air mixture.

In air duct 1, a cooling air bypass passage 11 is formed to communicate between bypass passage 9 for air mixture at an upstream side and face air outlet duct 3 at a upstream side (at a downstream side of the air outlet switching damper). In an opening portion of cooling air bypass passage 11 at an upstream side, a device for adjusting airflow into cooling air bypass passage 11, such as a plate-like cooling air bypass damper 12 is disposed. In this embodiment, temperature adjusting device 13 includes cooling air bypass passage 11 and cooling-air bypass damper 12.

According to the structure described above, it is possible to adjust the ratio of airflow supplied from the face air outlet and the foot air outlet by controlling the rotational position of air outlet mode switching damper 5 and to control the temperature of conditioned air from the face air outlet and the temperature of conditioned air from the foot air outlet independently by controlling each of the rotational positions of air-mix damper 10 and cooling air bypass damper 12.

Downstream of evaporator 7, a temperature sensor 14 at the back of evaporator 7 is disposed to detect a temperature TE of air having passed through evaporator 7. In heating unit 8, a water temperature sensor 15 is disposed to detect a temperature TW of cooling water passing through heating unit 8 while being in contact with piping of heating unit 8.

Air supply outlet mode switching damper 5, air-mix damper 10, and cooling air bypass damper 12 are operated by servomotors 5a, 10a, and 12a, respectively. Blower 6 is operated by a blower motor 6a. Each of servomotors 5a, 10a and 12a and blower motor 6a are controlled by ECU (Electronic Control Unit) 16.

The evaporator temperature sensor 14 produces a signal indicating the temperature TE of air having passed through evaporator 7, while the water temperature sensor 15 produces a signal indicating the temperature TW of cooling water passing through heating unit 8 and both signals are supplied to ECU 16. Further, ECU 16 is supplied with a signal for indicating a set temperature Tset for the setting temperature in the compartment by a temperature setting unit 17, a signal for indicating an inside air temperature Tr detected by an inside air temperature sensor 18, a signal for indicating an outside air temperature Tam detected by an outside temperature sensor 19, and a signal for indicating an amount of sunlight Ts detected by a sunlight sensor 20 are also supplied to ECU 16.

Figure 1:
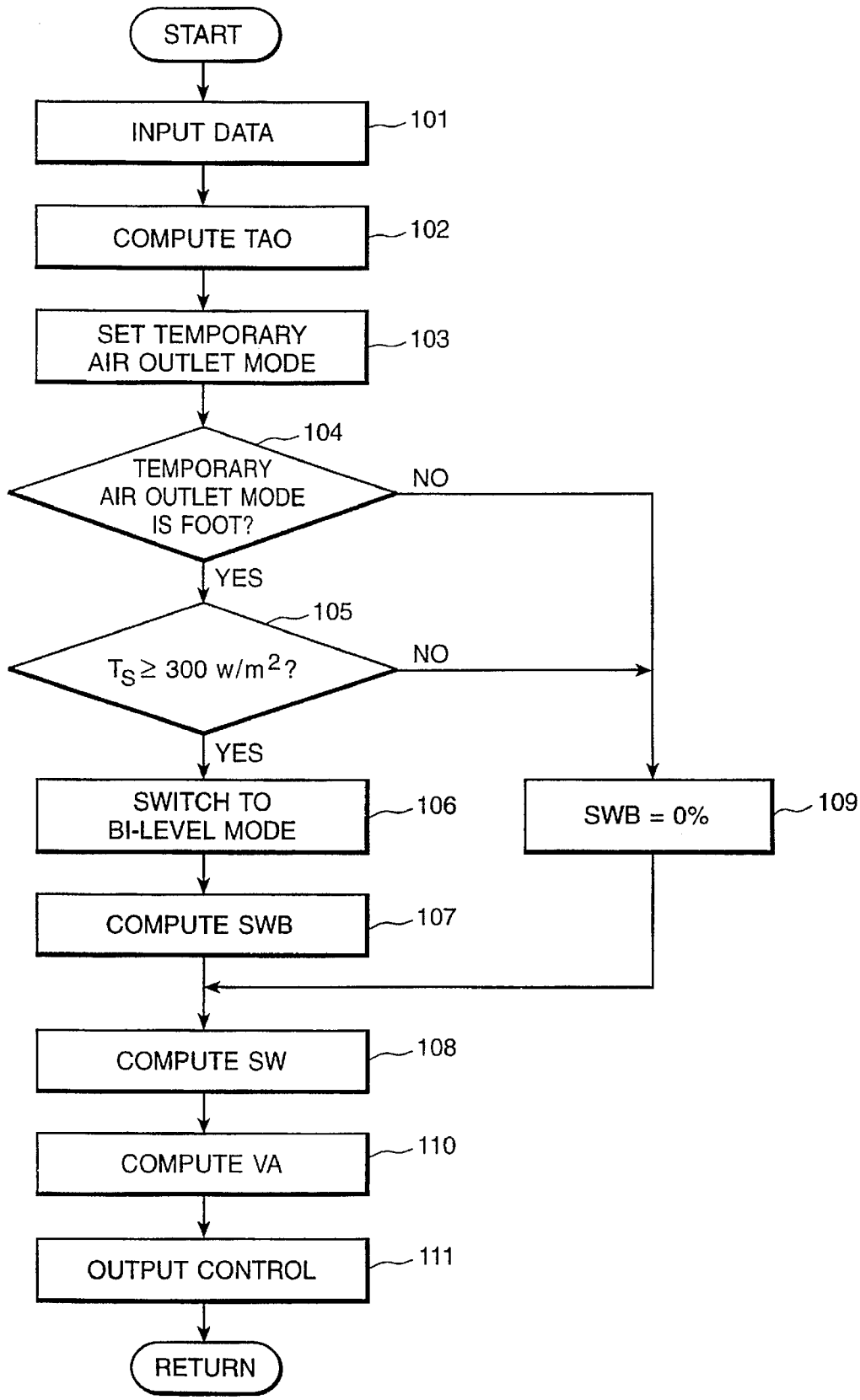
FIG. 1 is a flowchart showing a main control process in a first embodiment according to the present invention.

In FIG. 1, a flowchart illustrating a main control routine which is executed by ECU 16 is described below. Incidentally, electric current is supplied to ECU 16 from a battery mounted on a vehicle while an ignition switch of the vehicle is ON. ECU 16 starts to execute a control program for an air conditioning operation including control of refrigeration cycle for the air conditioning operation when a switch for starting the air conditioning operation is turned on while ECU 16 is being operated according to the electric current. The routine shown in FIG. 1 is included in the control program.

In FIG. 1, at step 101, set temperature Tset, inside air temperature Tr, outside air temperature Tam, amount of sunlight Ts, evaporator back side air temperature TE, and temperature TW of cooling water are inputted and stored in a memory for data processing (not shown). In step 102, a required supply is computed based on set temperature Tset, inside air temperature Tr, outside air temperature Tam, and amount of sunlight Ts by using the following formula (1).

$$TAO = Kset \cdot Tset - Kr \cdot Tr - Kam \cdot Tam - Ks \cdot Ts + C \cdot \quad (1)$$

At step 103, a temporary supply air mode is set based on the required supply air temperature TAO which has been obtained as above and a relationship between the required supply air temperature and the temporary air outlet mode. Namely, when the required supply air temperature TAO is comparatively high, a foot mode (FOOT) is, selected as the temporary air outlet mode. When the required supply air temperature TAO is comparatively low, a face mode (FACE) is selected. When the required supply air temperature TAO is an intermediate value between the above cases, a bi-level mode (B/L) is selected. As can be seen from FIG. 3, a predetermined hysteresis is supplied to a relationship between the required supply air temperature TAO and the temporary air outlet mode.

Then, whether the set temporary air outlet mode is a foot mode is judged at step 104, and whether the detected amount of sunlight Ts is equal to or greater than a predetermined switching level (e.g., 300 W/m$^2$) is judged at step 105.

When the amount of sunlight quantity Ts is equal to or greater than a predetermined switching level, the temporary air outlet mode is switched to a foot mode or bi-level mode (at step 106). In such a case, a ratio of airflow from the face air outlet and the foot air outlet in the bi-level mode is set to, for example, 1:1.

After switching air outlet mode at step 106 is executed, functions of auxiliary computing means and correcting means of the present invention are executed at step 107.

Figure 4:
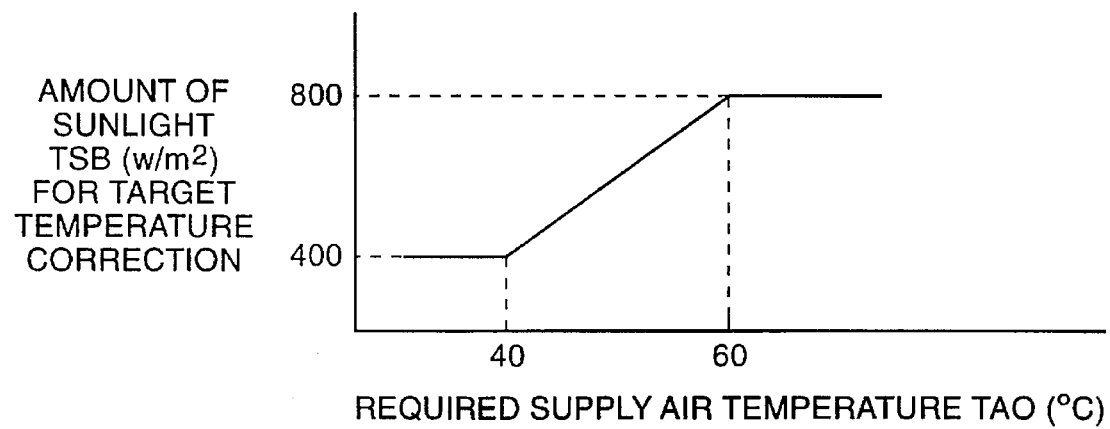
FIG. 4 is a graph showing a relationship between the required supply air temperature and the amount of sunlight for the target temperature correction according to the first embodiment.
Figure 5:
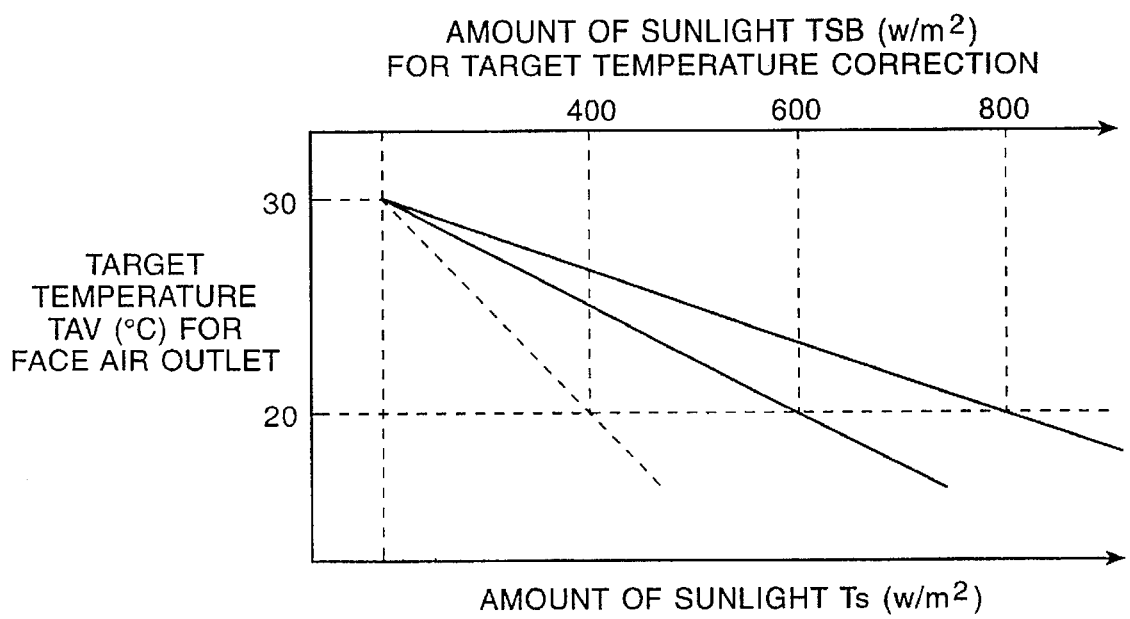
FIG. 5 is a graph showing a relationship between the amount of sunlight and the target supply air temperature for the face outlet according to the first embodiment.

At step 107, an amount of sunlight TSB for target temperature correction is obtained based on the required supply air temperature TAO and a predetermined relationship between the required supply air temperature and the amount of sunlight for target temperature correction as shown in FIG. 4. Then, a slope in a predetermined relationship between the amount of sunlight and the target supply air temperature for face air outlet as shown in FIG. 5 is obtained. Concretely, the target supply air temperature TAV for face air outlet is set based on the following formula:

$$TAV = -a \cdot Ts + c$$

("a" and "c" denote positive constants). Namely, target supply air temperature TAV linearly decreases in accordance with an increase in the amount of sunlight Ts as shown in FIG. 5. The slope of the line showing the relationship between the amount of sunlight and the target supply air temperature for the face air outlet is set by changing the constant "a" to a small value in accordance with an increase of the amount of sunlight TSB for target temperature correction. In the embodiment associated with FIG. 5, a relationship between the amount of sunlight and the target supply air temperature for the face air outlet in cases of TSB=600 (W/m$^2$), 400 (W/m$^2$), and 800 (W/m$^2$) are shown with a solid line, a broken line, and a two-dotted chain line, respectively.

A target supply air temperature for the face air outlet TAV is obtained based on the amount of sunlight Ts and the relationship between the amount of sunlight and the target supply air temperature for the face air outlet as described the above. An opening degree SWB (%) of cooling air bypass damper 12 is computer based on the target supply air temperature TAV, the evaporator back side air temperature TE stored at step 101, and the required supply air temperature TAO computed at step 102 by using the following formula (2).

$$SWB=(TAV-TE)\cdot 100/(TAO-TE) \qquad (2)$$

After step 107 is executed as described above, an opening degree of air mix damper 10 is computed at step 108. In case of a "NO" decision at step 104 or 105, namely, when the temporary air outlet mode which has been obtained from the relationship between the required supply air temperature and the temporary air outlet mode is not a foot mode, or when the amount of sunlight Ts detected by sunlight sensor 20 is less than the switching level, step 108 is processed after an opening degree SWB of cooling damper 12 is set to 0% at step 109.

At step 108, an opening angle SW (%) of the air mix damper 10 is computed based on the evaporator back side air temperature TE and the cooling water temperature TW stored at step 101, and the required supply air temperature TAO computed at step 102 by using the following formula (3).

$$SW=(TAO-TE)\cdot 100/(TW-TE) \qquad (3)$$

Figure 6:
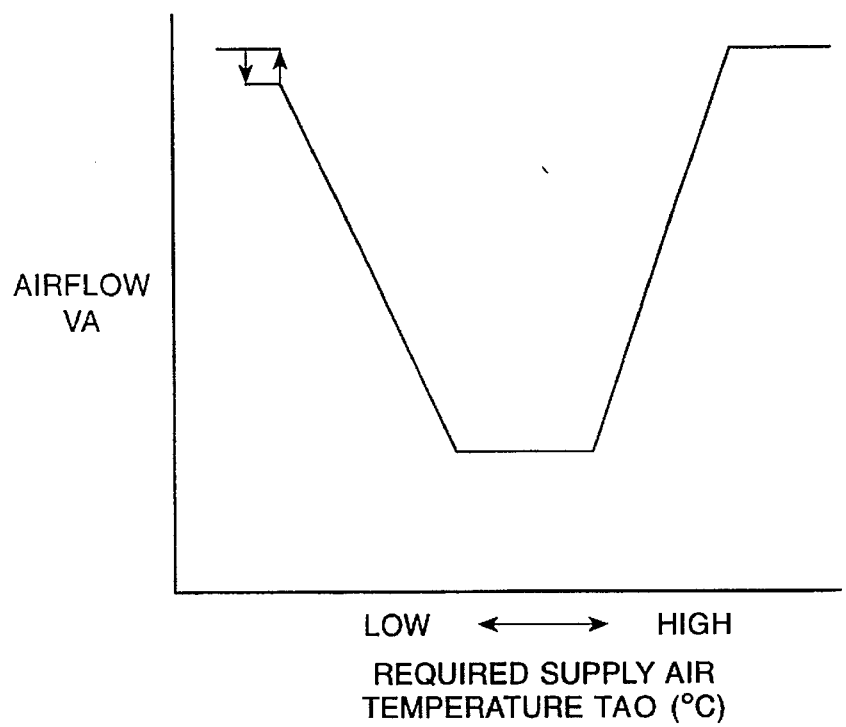
FIG. 6 is a graph showing a relationship between the required supply air temperature and the airflow quantity according to the first embodiment.

At step 110, an airflow VA of blower 6 (which corresponds to a control voltage of blower motor 6a) is obtained based on the required supply air temperature TAO and to a predetermined characteristics between the required supply air temperature and the airflow shown in FIG. 6.

Then, the following control is performed at step 111. An air outlet mode is controlled to be the predetermined mode which has been selected at step 103 or step 106 by operating air outlet mode switching damper 5 with servomotor 5a. An opening degree of cooling air bypass damper 12 is controlled to assume the predetermined opening degree SWB which has been obtained at step 107 or 109 by using servomotor 12a, an opening degree of air mix damper 10 is controlled to assume the predetermined opening degree SW which has been obtained at step 108 by using servomotor 10a, and a selected voltage is supplied to blower 6a to obtain the blower airflow VA determined at step 110.

Figure 7:
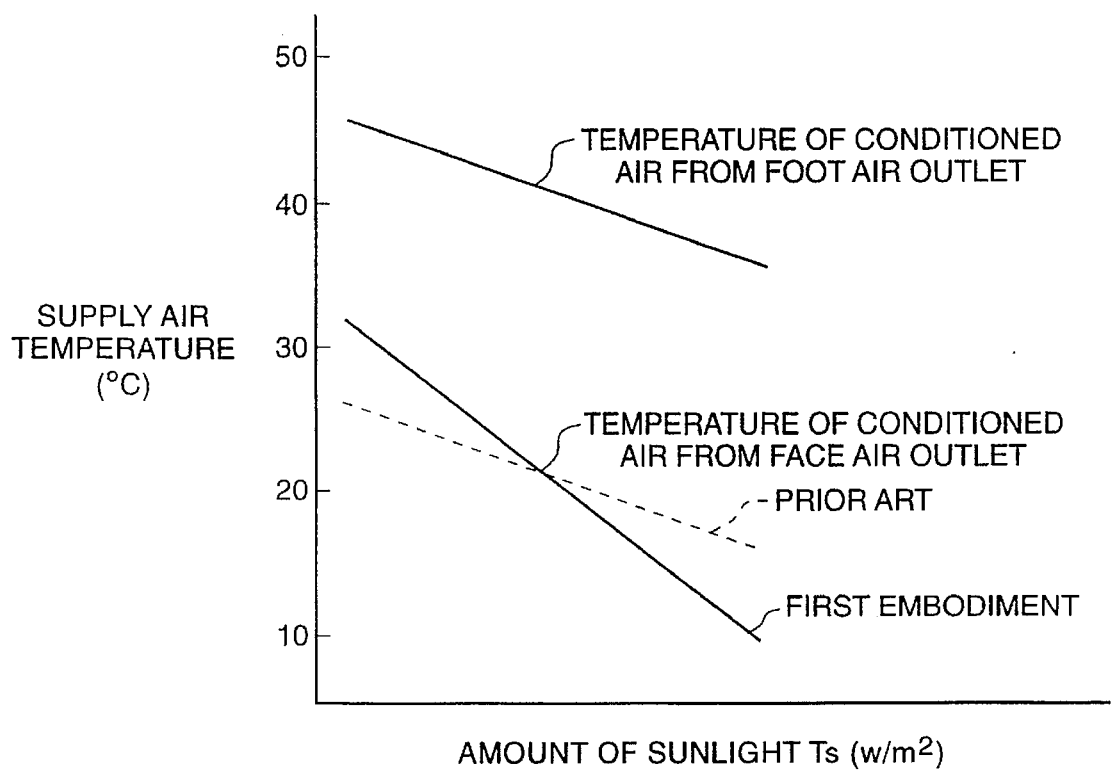
FIG. 7 is a graph showing a characteristics of relationship between the amount of sunlight and the actual temperature of conditioned air according to the first embodiment.

As a result of performing these control steps, the temperature of conditioned air from the foot air outlet in the bi-level mode is controlled to be the required supply air temperature TAO and decreases in accordance with an increase in the amount of sunlight Ts as shown in FIG. 7. The temperature of conditioned air from the face air outlet is controlled based on the target supply air temperature AV for the face air outlet independently of the temperature of conditioned air from the foot air outlet.

Namely, the target supply air temperature TAV for the face air outlet is corrected to become lower gradually in accordance with an increase of the amount of sunlight Ts, and the correction quantity is controlled to become lower in accordance with a rise in the required air outlet temperature TAO. Thereby, the temperature of conditioned air from the face air outlet goes down in accordance with an increase in the amount of sunlight Ts as shown by the solid line in FIG. 7.

Incidentally, the temperature change of conditioned air from the face air outlet (which changes in accordance with the temperature of conditioned air from the foot air outlet) is shown by the broken line in FIG. 7, where a conventional correction control that the required air outlet temperature TAO is lowered simply in accordance with an increase in the amount of sunlight Ts is performed. In such a case, an airflow VA of blower 6 increases in accordance with an increase of the required air outlet temperature TAO (i.e., the temperature of conditioned air from the foot air outlet) as shown in FIG. 6.

According to this embodiment, as can be seen from FIG. 7, a correction (lower) ratio of temperature of conditioned air from the foot air outlet by the amount of sunlight Ts becomes smaller in accordance with an increase of temperature of conditioned air from the foot air outlet, namely, in accordance with an increase of airflow from the face air outlet, and the temperature of the conditioned air from the face air outlet is higher than in the prior art systems.

In this embodiment, it is possible to achieve a linear relationship between the correction quantity of conditioned air temperature from the face air outlet by the amount of sunlight Ts and the conditioned air temperature the passenger feels, and the air conditioning feeling is improved even under a condition where supply airflow from the face air outlet varies in the bi-level mode. In this embodiment, the temperature of conditioned air is not corrected simply based on the amount of sunlight Ts from the foot air outlet, and the temperature of conditioned air from the foot air outlet (which corresponds to the required supply air temperature TAO) beside the correction quantity are also considered as one element, thereby improving the air conditioning feeling. Even when the foot mode is switched to bi-level mode and the supply airflow from the face air outlet increases rapidly, the deterioration of air conditioning feeling which occurs in prior art systems is prevented.

Figure 8:
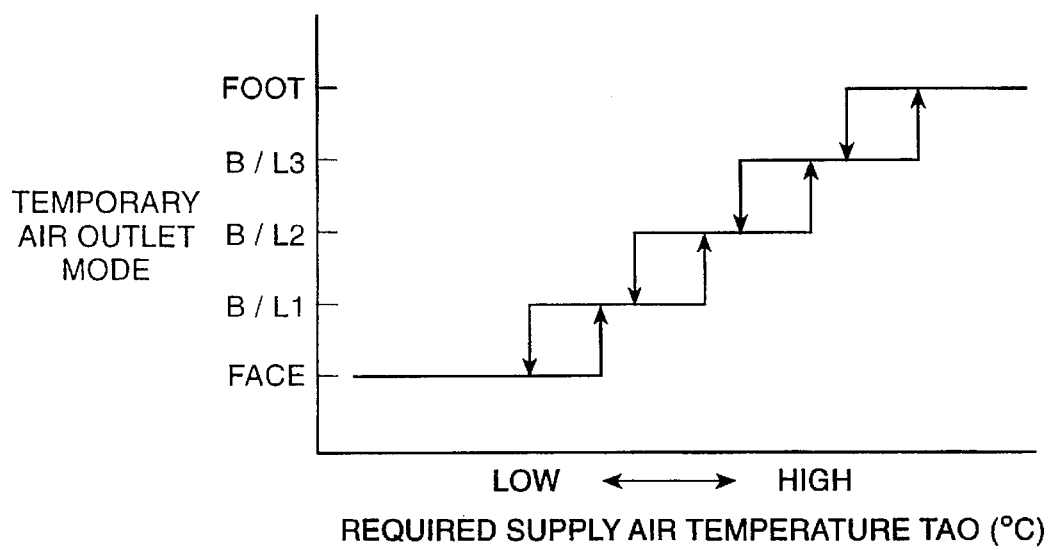
FIG. 8 is a graph showing the effect of a modification of the first embodiment.

In the first embodiment, the ratio of airflow from the face air outlet and the foot air outlet in the bi-level mode is set to a single ratio of 1:1. However, it is also possible that the ratio of airflow in the bi-level mode can be set to many different ratios. Concretely, as shown in FIG. 8, a temporary supply air mode including three steps of bi-level mode (B/L1, B/L2, and B/L3) can be set in addition to a foot mode (FOOT) and a face mode (FACE), and one of these steps is selected based on the required supply air temperature TAO.

In such a case, when an amount of sunlight Ts is equal to or greater than a switching level, the foot mode is switched to the bi-level mode (B/L1) and a rapid increase ratio of supply airflow from the face air outlet is restrained.

The ratio of airflow from the face air outlet and the foot air outlet in each bi-level mode (B/L1, B/L2, and B/L3) is set suitably, for example, to 7/3, 1/1, 3/7 so that the airflow ratio at the foot supply air side becomes larger in accordance with an increase in the required supply air.

In the first embodiment, the target air outlet temperature TAV for the face air outlet in the bi-level mode is computed based on the amount of sunlight Ts. However, it is also possible to obtain the target air outlet temperature TAV for the face air outlet based on a set temperature Tset by the temperature setting unit 17 to a predetermined relationship between the set temperature and the required air outlet temperature for the face supply air shown in FIG. 9. In such a case, when the correction that the target air outlet temperature TAV for the face air outlet goes up in accordance with an increase of the required supply air temperature TAO is performed in the same way of the first embodiment described above, it is possible to keep a linear relationship between the changing quantity of temperature of conditioned air according to the set temperature T set and the temperature the passenger feels, and thereby improve an air conditioning feeling.

In the first embodiment, the amount of sunlight TSB for the target temperature correction is obtained based on the required supply air temperature TAO; however, it is also possible that the amount of sunlight TSB for the target temperature correction is obtained based on a ratio of supply airflow from the face air outlet and the foot air outlet in the bi-level mode (i.e., a mode ratio). A second embodiment of the present invention in which the above control is performed is described below with respect to FIGS. 10-16.

Figure 10:
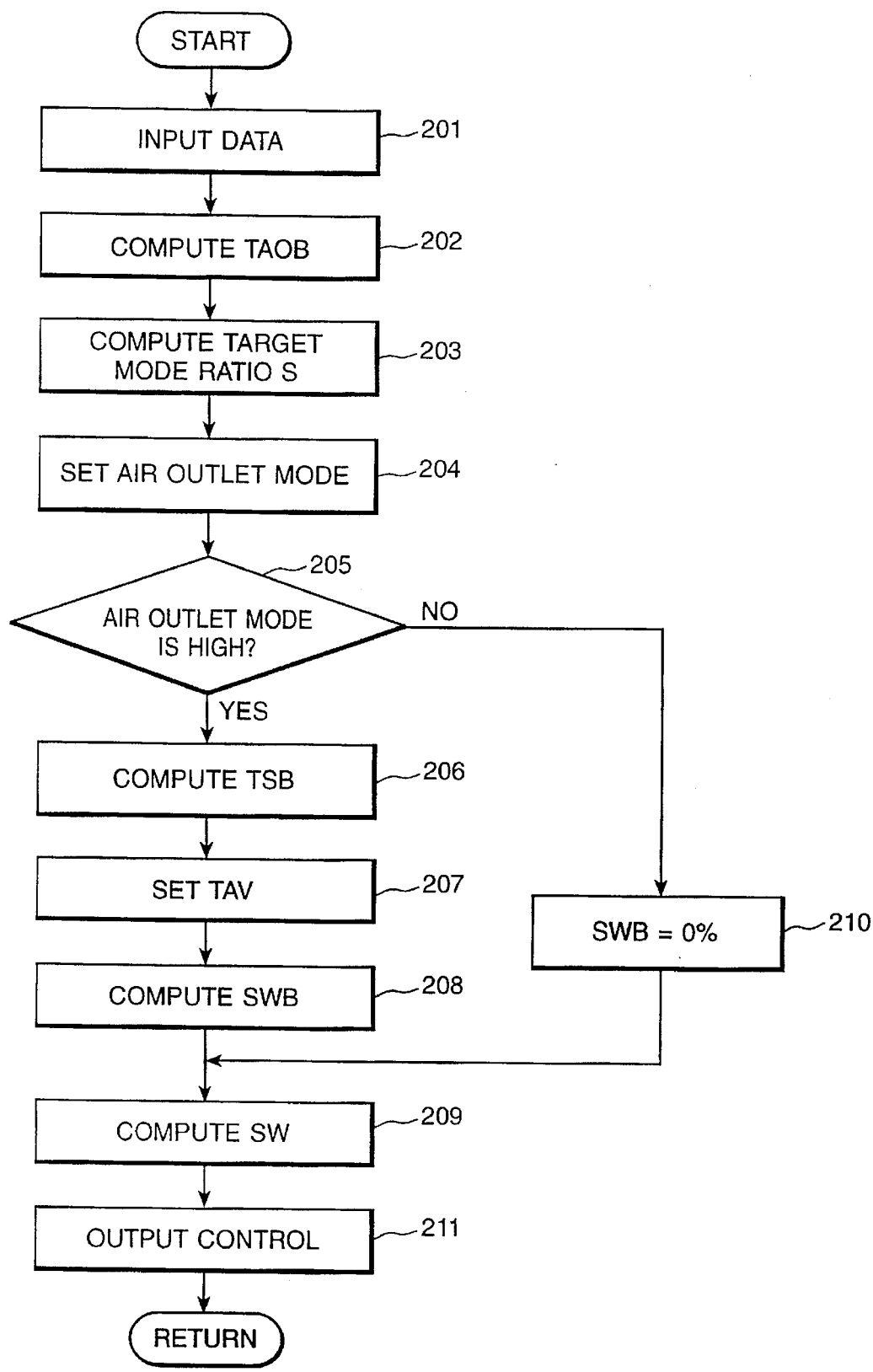
FIG. 10 is a flowchart showing a main control process in a second embodiment according to the present invention.

In FIG. 10 showing a control executed by ECU 16, a set temperature Tset, an inside air temperature Tr, an outside air temperature Tam, an amount of sunlight Ts, and an evaporator back side air temperature TE, a cooling water temperature TW for engine are stored in a memory for data processing (not shown) at step 201. At step 202, a required supply air temperature TAOB is computed based on the set temperature Tset, the inside air temperature Tr, the outside air temperature Tam, and the amount of sunlight Ts by using the following formula (4). In the formula (4), Kset denotes an inside air gain, Kam denotes an outside air gain, Ksb denotes an amount of sunlight gain, and C denotes a correction constant.

$$TAOB=Kset \cdot Tset-Kr \cdot Tr-Kam \cdot Tam-Ksb \cdot Ts+C \quad (4)$$

At step 203, a target mode ratio S is computed based on the required supply air temperature TAOB as obtained above. The target mode ratio S means a ratio of supply airflow from the foot air outlet to the whole supply airflow; accordingly, S is "0" in the face mode, and S is "1" in the foot mode.

Figure 11:
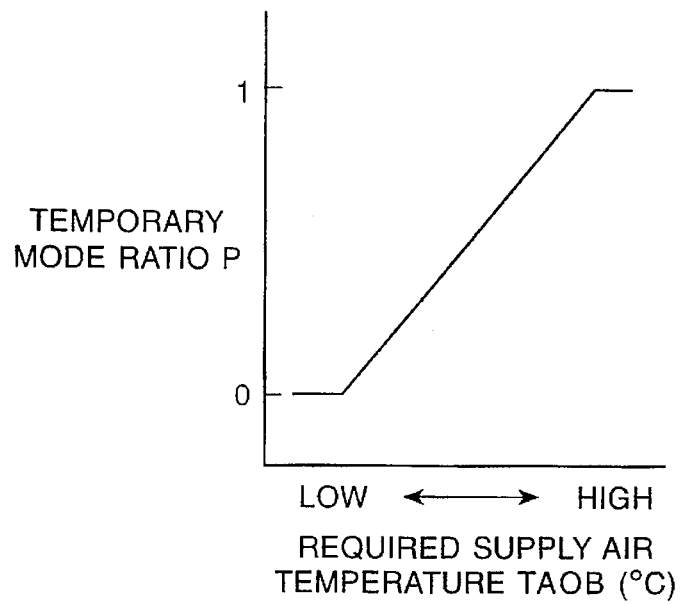
FIG. 11 is a graph showing a relationship between the required supply air temperature and the temporary mode ratio according to the second embodiment.
Figure 12:
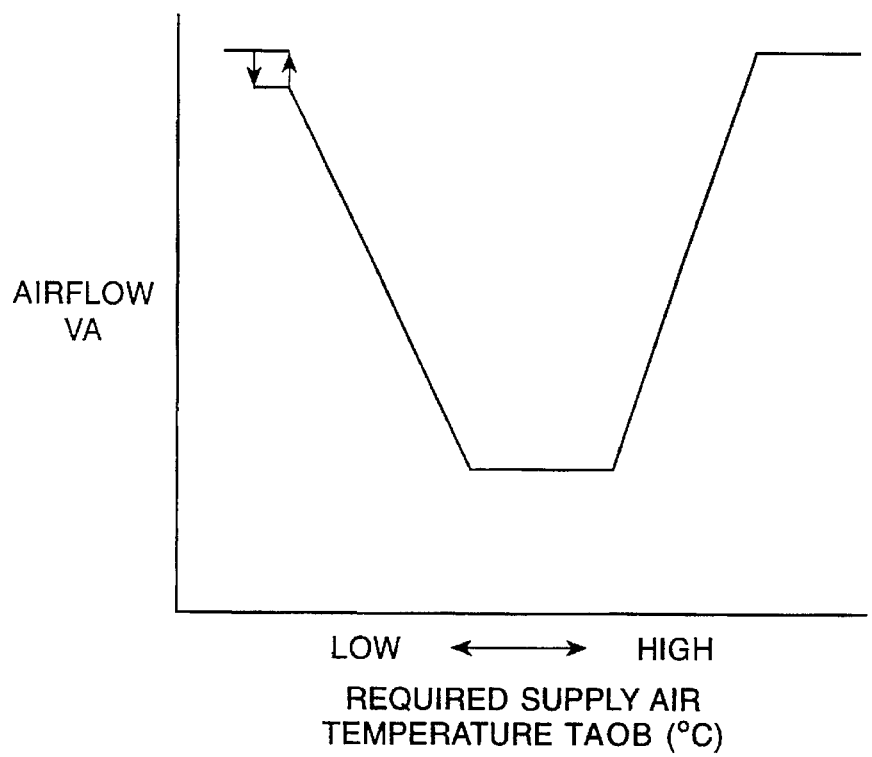
FIG. 12 is a graph showing a relationship between the required supply air temperature and the airflow quantity according to the second embodiment.
Figure 13:
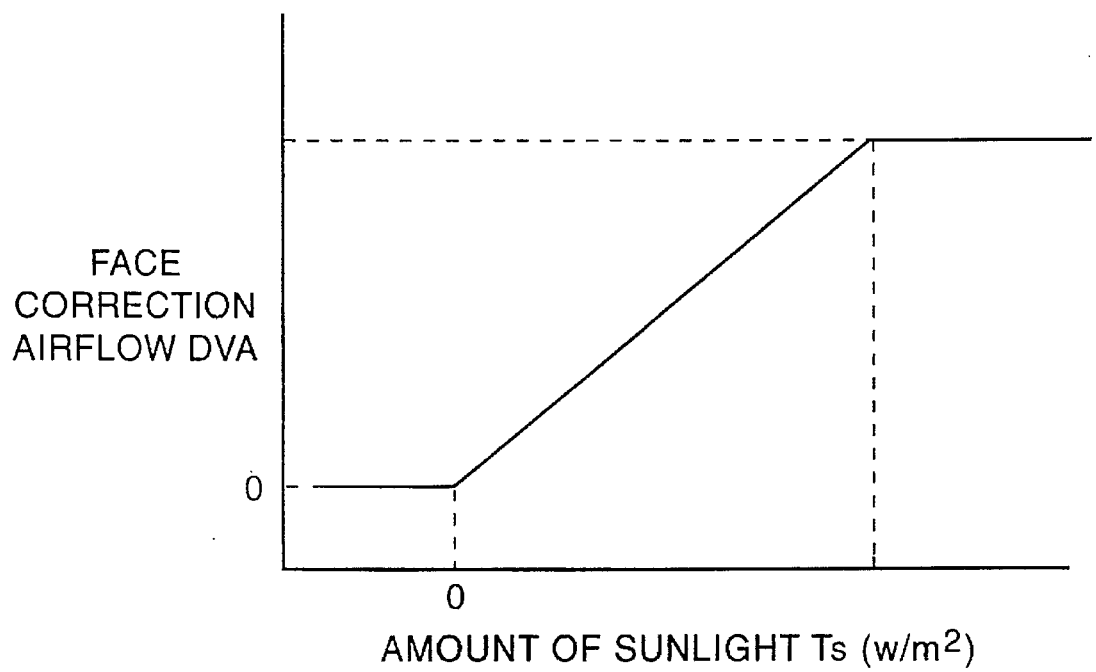
FIG. 13 is a graph showing a relationship between the amount of sunlight and the face correction airflow quantity according to the second embodiment.

Concretely, at step 203, a temporary mode ratio P is obtained based on the required supply air temperature TAOB and a predetermined relationship between the required supply air temperature and the temporary mode ratio shown in FIG. 11. An airflow VA of blower 6 is obtained based on the required supply air temperature TAOB and a predetermined relationship between the required supply air temperature and the airflow shown in FIG. 12. A face correction airflow DVA is obtained based on the amount of sunlight Ts and a predetermined relationship between the amount of sunlight and the face correction airflow shown in FIG. 13.

Then, a target mode ratio S is computed based on the temporary mode ratio P, the airflow VA, the face correction airflow DVA by using the following formula.

$$S=P \cdot VA/(VA+DVA) \quad (5)$$

Figure 14:
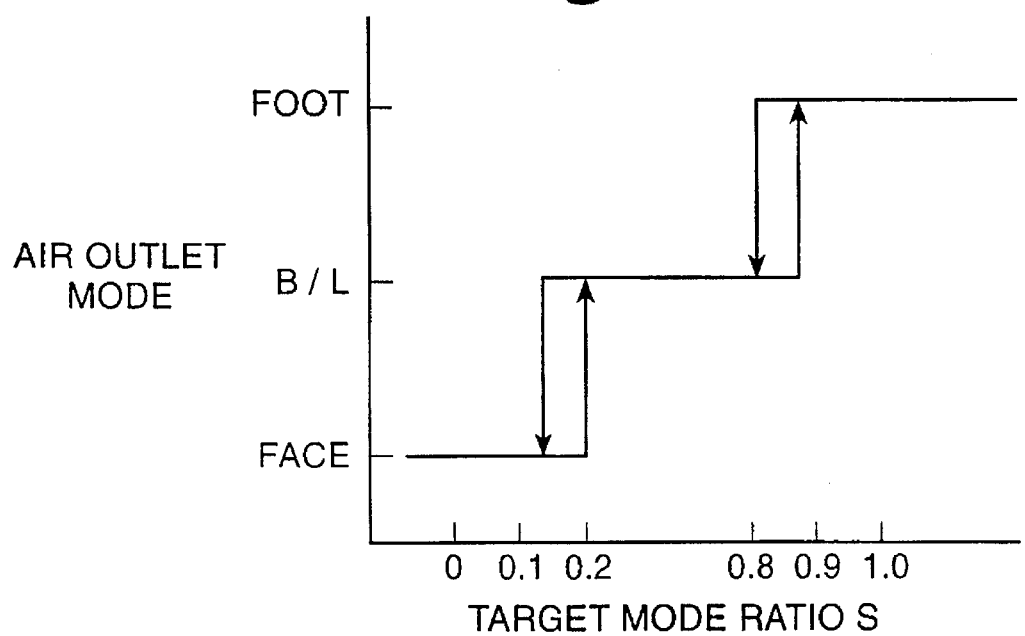
FIG. 14 is a graph showing a relationship between the target mode ratio and the amount of sunlight for the target temperature correction according to the second embodiment.

At step 204, an air outlet mode is obtained based on the target mode ratio S obtained above and a predetermined relationship between the mode ratio and the air outlet mode shown in FIG. 14. Namely, when the target mode ratio S is comparatively high, the foot mode (FOOT) is selected. When the target mode ratio S is comparatively low, the face mode (FACE) is selected. When the target mode ratio S is at an intermediate level between the above cases, the bi-level mode (FACE) where conditioned air flows from both the face air outlet and the foot air outlet is selected. As seen in FIG. 14, a predetermined hysteresis is supplied to a relationship between the target mode ratio S and the supply air mode.

Figure 15:
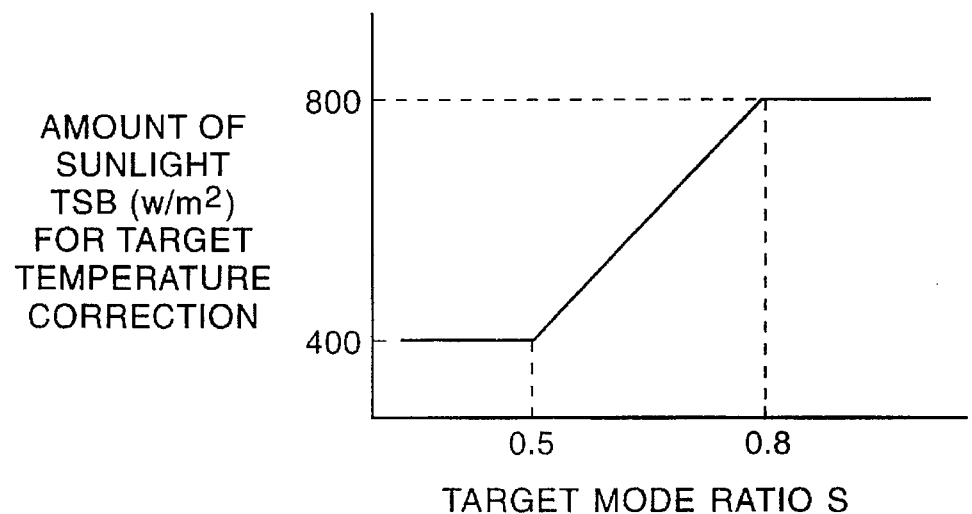
FIG. 15 is a graph showing a relationship between the target mode ratio and the target supply air temperature according to the second embodiment.

Then, step 205 determines whether or not the air outlet mode which has been obtained is a bi-level mode. When the air outlet mode is a bi-level mode, an amount of sunlight TSB for target temperature correction is computed based on the target mode ratio at step 206. At step 206, the amount of sunlight TSB for target temperature correction is obtained based on the target mode ratio S and a predetermined relationship between the target mode ratio and the amount of sunlight TSB for target temperature correction as shown in FIG. 15.

At step 207, firstly, a slope in the graph describing the relationship between the amount of sunlight and the target supply air temperature for the face air outlet is obtained based on the amount of sunlight TSB for target temperature correction. In such a case, the target supply air temperature for the face air outlet TAV is set based on the following formula:

$$TAV=-a \cdot Ts+c$$

("a" and "c" denote positive constants) in the same manner as in the first embodiment. The slope in the graph describing the relationship between the amount of sunlight and the target supply air temperature for the face air outlet is set by changing the constant "a" to a small value in accordance with an increase of the amount of sunlight TSB for target temperature correction. The target supply air temperature TAV for the face air outlet is obtained based on the amount of sunlight Ts and the relationship between the amount of sunlight and the target supply air temperature for << the face air outlet.

At step 208, an opening degree SWB (%) of a cooling air bypass damper 12 is obtained based on the target supply air temperature TAV, the evaporator back side air temperature TE stored at step 201, and the required supply air temperature TAOB computed at step 202 by using the following formula (6).

$$SWB=(TAV-TE) \cdot 100/(TAOB-TE) \quad (6)$$

After the opening degree SWB (%) is obtained, an opening degree SW of the air mix damper 10 is computed at step 209. When there is a "NO" result at step 205, i.e., the air outlet mode which has been obtained from the relationship between the required supply air temperature and the supply air mode is not a bi-level mode (e.g., it is actually a foot mode), an opening degree SWB of the cooling air bypass damper is set to 0% at step 210.

At step 209, an opening degree SW (%) of the air mix damper 10 is obtained based on the evaporator back side air temperature TE and cooling water temperature TW for the engine stored at step 201 and the required supply air temperature TAOB computed at step 202 by using the following formula (7).

$$SW=(TAOB-TE) \cdot 100/(TW-TE) \quad (7)$$

Then, the following control is performed at step 211. Art air outlet mode is controlled to the predetermined mode which has been selected at step 204 by operating air outlet mode switching damper 5 with servomotor 5a. An opening degree of cooling air bypass damper 12 is controlled to the predetermined opening degree SWB which has been obtained at step 208 or 210 by using servomotor 12a, an opening degree of air mix damper 10 is controlled to the predetermined opening degree SW which has been obtained at step 209 by using servomotor 10a, and a necessary voltage is supplied to blower 6a to obtain the blower airflow VA which has been obtained at step 203.

Figure 17:
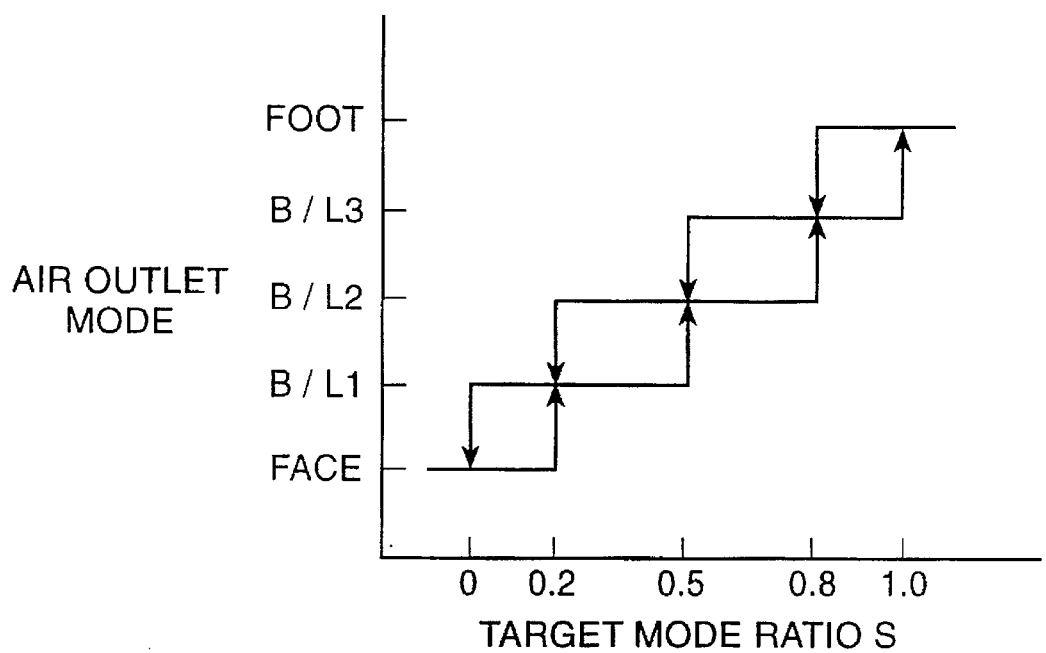
FIG. 17 is a graph showing the effect of a modification of the second embodiment.

In this embodiment, it is possible to control the temperature of conditioned air from the face air outlet and the temperature of conditioned air from the foot air outlet independently. In the same way as in the first embodiment, it is especially possible to keep a linear relationship between the correction quantity of conditioned air from the face air outlet by the amount of sunlight Ts and the temperature a passenger feels when supply airflow from the face air outlet varies in the bi-level mode, because the temperature of conditioned air from the foot air outlet is not corrected simply based on the amount of sunlight Ts and the correction quantity is changed in consideration of the target mode ratio S, i.e., a parameter which goes up in accordance with an increase in the required supply air temperature for determining a temperature of conditioned air from the foot air outlet is applied, thereby improving air conditioning feeling. In the second embodiment, the ratio of airflow from the face air outlet and the foot air outlet in the bi-level mode is set to a single ratio of 1:1. However, it is also possible that the ratio of airflow in the bi-level mode is set to many possible steps. For example, as shown in FIG. 17, a temporary supply air mode including three steps of bi-level mode (B/L1, B/L2, and B/L3) can be set in addition to a foot mode (FOOT) and a face mode (FACE), and one of these steps is selected based on the target mode ratio S.

Figure 9:
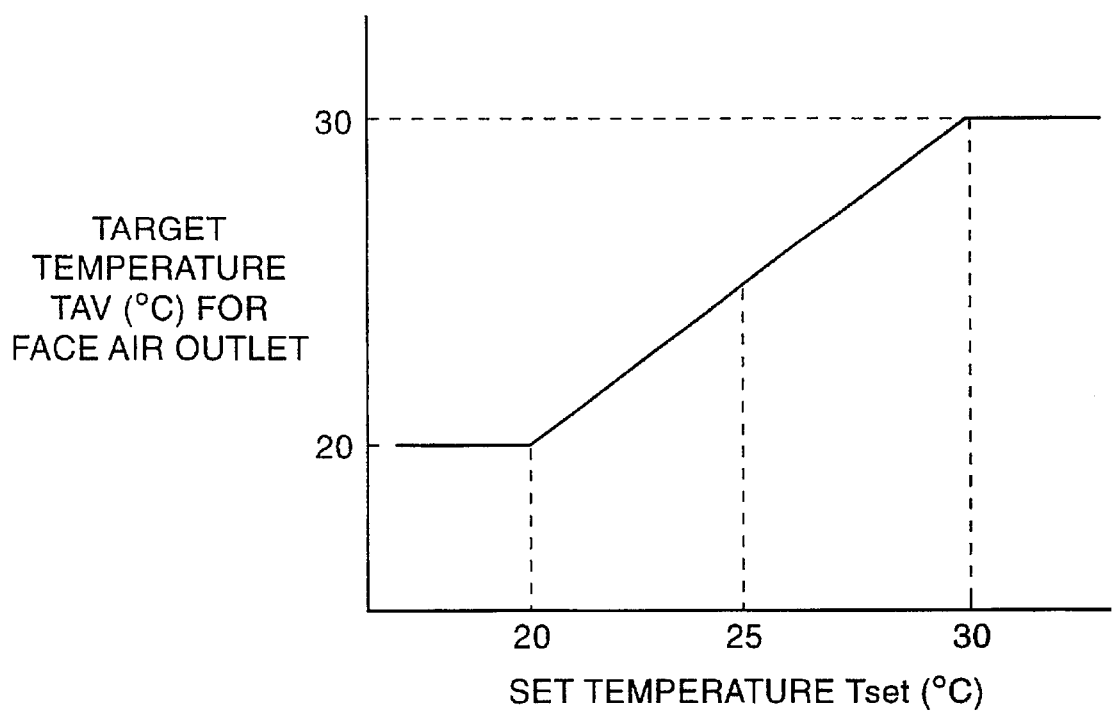
FIG. 9 is a graph showing a relationship between the set temperature and the target supply air temperature for the face air outlet in the modification.

In the second embodiment, it is also possible to obtain the target air outlet temperature TAV for the face air outlet by applying a set temperature Tset by the temperature setting unit 17 to the prepared characteristics between the set temperature and the target supply air temperature for the face air outlet shown in FIG. 9.

Figure 18:
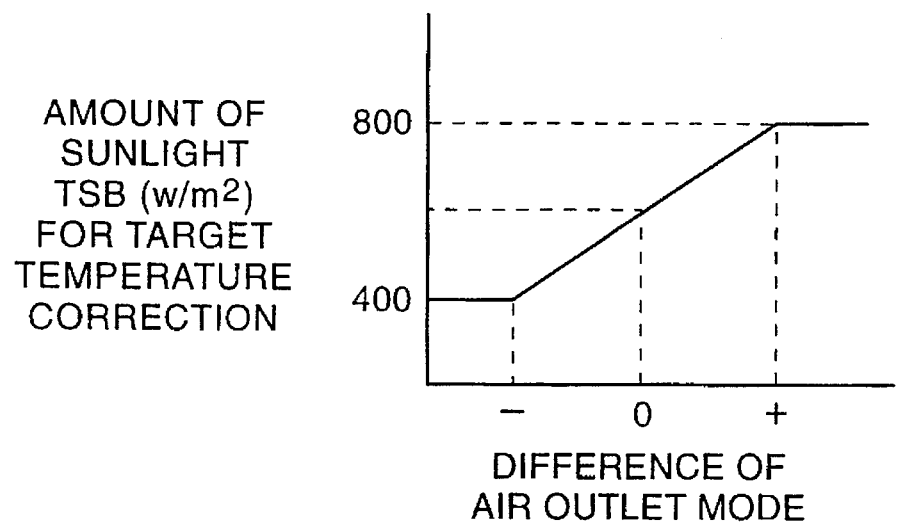
FIG. 18 is a graph showing a relationship between the air outlet mode and the amount of sunlight for the target temperature correction.

In the second embodiment, the amount of sunlight TSB for target temperature correction is obtained based on the target mode ratio S and the relationship shown in FIG. 15, however, as a third embodiment shown in FIG. 18, it is possible to obtain the amount of sunlight TSB for target temperature correction based on a difference between the target mode ratio S and the data for showing an actual mode ratio (e.g., an actual airflow ratio, or a physical quantity for showing a position of the supply air outlet mode switching damper) and to obtain a slope of the graph describing the relationship between the amount of sunlight and the target supply air temperature for the face air outlet based on the amount of sunlight TSB for target temperature correction obtained above.

Figure 16:
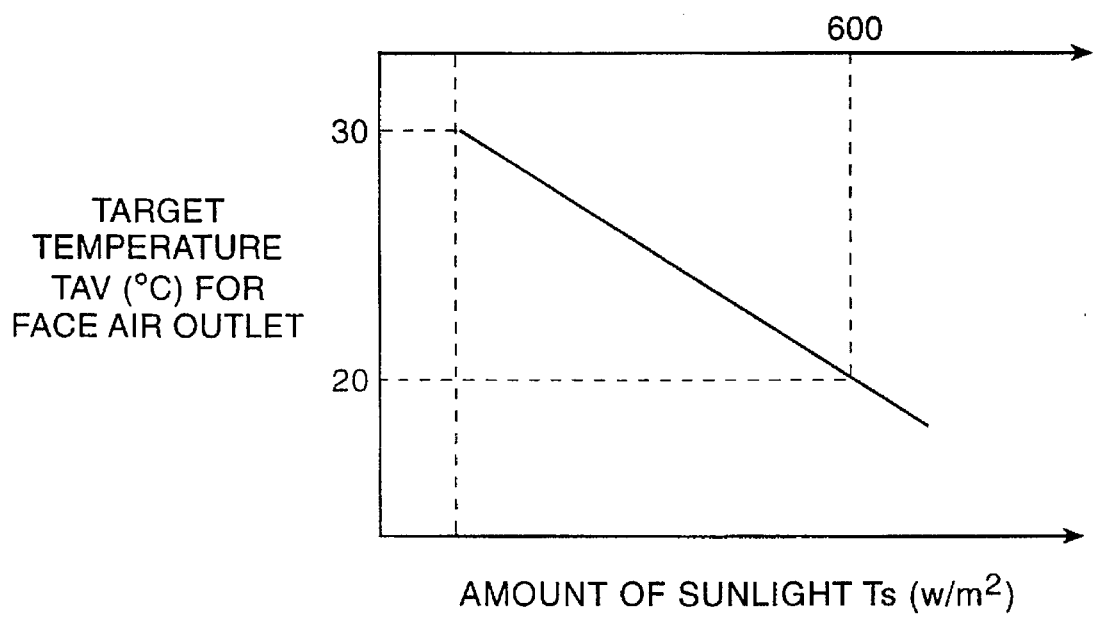
FIG. 16 is a graph showing a relationship between the amount of sunlight and the target supply air temperature for the face outlet according to the second embodiment.

In such a case, the target supply air temperature TAV for the face air outlet is corrected to be smaller in accordance with an increase in the amount of sunlight Ts and the correction quantity at that time is controlled to be smaller in accordance with an increase in the difference of the air outlet mode, because a slope of the graph describing the relationship between the amount of sunlight and the target supply air temperature for the face air outlet (as shown in FIG. 16) is controlled to be smaller in accordance with the target mode ratio S becoming greater than an actual mode ratio. Namely, when an actual airflow from the face air outlet is greater than the target airflow, the target supply air temperature TAV for the face air outlet is corrected to be higher. In such a case, it is also possible to keep a linear relationship between the correction quantity of the temperature of conditioned air from the face air outlet by the amount of sunlight Ts and the temperature a passenger feels, and thereby improve the air conditioning feeling.

The present invention is not limited to the above embodiments, and the following modifications or applications are possible.

In each of the above embodiments, the present invention is applied to a vehicle air conditioning apparatus equipped with temperature adjusting means including cooling air bypass passage 11 and cooling air bypass damper 12; however, the present invention may be applied to vehicle air conditioning apparatus which is capable of controlling temperatures of conditioned air from the face air outlet and foot air outlet independently, for example, a so-called two air-mix damper type air conditioning apparatus for vehicles; that is, an air conditioning apparatus for vehicles equipped as temperature adjusting means with two air mix dampers for independently controlling an air mix quantity of conditioned air toward the face air outlet and the foot air outlet, or a re-heat type air conditioning apparatus for vehicles for adjusting a bypassing quantity of cooling air toward the face air outlet.

Each of the curved lines shown in FIGS. 3–6, 8, 9, and 11–18 can be modified according to the structure and capacity of air conditioning apparatus. Evaporator 7 may be provided as needed. Heating unit 8 is not limited to a cooling water circulating type unit, and an electric heater can be used instead.

According to the present invention, as can be clearly understood from the above description, when the temperature of conditioned air from the face air outlet is corrected according to the amount of sunlight into the compartment or the set temperature by the setting unit, it is possible to keep a linear relationship between the correction quantity of the temperature of conditioned air and the temperature a passenger feels in the bi-level mode where conditioned air is supplied from both the face air outlet and the foot air outlet, and thereby improve the air conditioning feeling.

The present invention has been described in connection with what are presently considered to be the most practical preferred embodiments. However, the invention is not meant to be limited to the disclosed embodiments, but rather is intended to include all modifications and alternative arrangements included within the spirit and scope of the appended claims.

What is claimed is:

1. An air conditioning apparatus for a vehicle having a passenger compartment, said apparatus comprising:
    an air duct forming an air passage therein, said air duct comprising:
        an inlet for receiving air to be conditioned,
        a face outlet, directed to an upper portion of said passenger compartment, to supply conditioned air into said passenger compartment, and
        a foot outlet, directed to a lower portion of said passenger compartment, to supply conditioned air into said passenger compartment;
    a blower for blowing air in said air passage;
    temperature setting means for setting a target temperature in said passenger compartment;
    temperature adjusting means for controlling independently a first temperature of conditioned air blown out from said face air outlet and a second temperature of conditioned air blown out from said foot air outlet;
    an inside air temperature sensor for detecting an inside air temperature of said passenger compartment;
    a sunlight sensor for detecting an amount of sunlight entering said passenger compartment;
    required air temperature computing means for computing a required temperature of air blown into said passenger compartment based at least on a deviation between said target temperature set by said temperature setting means and said inside air temperature detected by said inside air temperature sensor;
    face target air temperature computing means for computing, in a bi-level mode of said air conditioning apparatus wherein air is blown out from both said face air outlet and said foot air outlet, a face target air temperature of air blown from said face air outlet, said face target air temperature being lowered in accordance with a corresponding increase of said amount of sunlight detected by said sunlight sensor;

face target air temperature correcting means for correcting said face target air temperature to be higher in accordance with an increase of a volume of said air blown out from said face air outlet; and face air temperature control means for controlling, in said bi-level mode of said air conditioning apparatus, said temperature adjusting means to set said first temperature to said face target air temperature;

foot air temperature control means for controlling, in said bi-level mode of said air conditioning apparatus, said temperature adjusting means to set said second temperature to said required air temperature computed by said required air temperature computing means.

2. An air conditioning apparatus according to claim 1, wherein:

in said bi-level mode, a volume of air blown by said blower is increased in accordance with an increase of said required air temperature; and said face target air temperature correcting means corrects said face target air temperature to be higher in accordance with an increase of said required air temperature.

3. An air conditioning apparatus according to claim 1, further comprising:

air amount ratio computing means for computing an air amount ratio of an amount of air blown out from said face air outlet to an amount of air blown out from said foot air outlet to be higher in accordance with an increase of said required air temperature;

in said bi-level mode, a volume of air blown by said blower being increased in accordance with an increase of said required air temperature; and said face target air temperature correcting means corrects said face target air temperature to be higher in accordance with an increase of said air amount ratio.

4. An air conditioning apparatus according to claim 1, further comprising:

mode switching means for switching between a foot mode where said foot air outlet is opened and said face air outlet is closed and said bi-level mode, when said amount of sunlight is equal to or greater than a predetermined value.

5. An air conditioning apparatus according to claim 1, further comprising:

a cooling bypass passage for supplying cool air only to said face air outlet; and airflow switching means for changing an airflow of said cool air passing through said cooling bypass passage.

6. An air conditioning apparatus according to claim 1, wherein:

said face target air temperature correcting means increases said face target air temperature in accordance with an increase of a difference between a target airflow ratio and an actual airflow ratio, said target airflow ratio being a ratio of a target amount of air blown out from said face air outlet to a target amount of air blown out from said foot air outlet, and said actual airflow ratio being a ratio of an actual amount of air blown out from said face air outlet to an actual amount of air blown out from said foot air outlet.

7. An air conditioning apparatus for a vehicle having a passenger compartment, said apparatus comprising:

an air duct forming an air passage therein, said air duct comprising:

an inlet for receiving air to be conditioned, a face outlet, directed to an upper portion of said passenger compartment, to supply conditioned air into said passenger compartment, and a foot outlet, directed to a lower portion of said passenger compartment, to supply conditioned air into said passenger compartment;

a blower for blowing air in said air passage;

temperature setting means for setting a target temperature in said passenger compartment;

temperature adjusting means for controlling independently a first temperature of conditioned air blown out from said face air outlet and a second temperature of conditioned air blown out from said foot air outlet;

an inside air temperature sensor for detecting an inside air temperature of said passenger compartment;

a sunlight sensor for detecting an amount of sunlight entering said passenger compartment;

required air temperature computing means for computing a required temperature of air blown into said passenger compartment based at least on a deviation between said target temperature set by said temperature setting means and said inside air temperature detected by said inside air temperature sensor;

face target air temperature computing means for computing, in a bi-level mode of said air conditioning apparatus wherein air is blown out from both said face air outlet and said foot air outlet, a face target air temperature of air blown from said face air outlet, said face target air temperature being lowered in accordance with a corresponding decrease of said target temperature set by said temperature setting means;

face target air temperature correcting means for correcting said face target air temperature to be higher in accordance with an increase of a volume of said air blown out from said face air outlet; and face air temperature control means for controlling, in said bi-level mode of said air conditioning apparatus, said temperature adjusting means to set said first temperature to said face target air temperature;

foot air temperature control means for controlling, in said bi-level mode of said air conditioning apparatus, said temperature adjusting means to set said second temperature to said required air temperature computed by said required air temperature computing means.

8. An air conditioning apparatus according to claim 7, wherein:

in said bi-level mode, a volume of air blown by said blower is increased in accordance with an increase of said required air temperature; and said face target air temperature correcting means corrects said face target air temperature to be higher in accordance with an increase of said required air temperature.

9. An air conditioning apparatus according to claim 7, further comprising:

air amount ratio computing means for computing an air amount ratio of an amount of air blown out from said face air outlet to an amount of air blown out from said foot air outlet to be higher in accordance with an increase of said required air temperature;

in said bi-level mode, a volume of air blown by said blower being increased in accordance with an increase of said required air temperature; and said face target air temperature correcting means corrects said face target air temperature to be higher in accordance with an increase of said air amount ratio.

10. An air conditioning apparatus according to claim 7, further comprising:

mode switching means for switching between a foot mode where said foot air outlet is opened and said face air outlet is closed and said bi-level mode, when said amount of sunlight is equal to or greater than a predetermined value.

11. An air conditioning apparatus according to claim 7, further comprising:

a cooling bypass passage for supplying cool air only to said face air outlet; and airflow switching means for changing an airflow of said cool air passing through said cooling bypass passage.

12. An air conditioning apparatus according to claim 7, wherein:

said face target air temperature correcting means increases said face target air temperature in accordance with an increase of a difference between a target airflow ratio and an actual airflow ratio, said target airflow ratio being a ratio of a target amount of air blown out from said face air outlet to a target amount of air blown out from said foot air outlet, and said actual airflow ratio being a ratio of an actual amount of air blown out from said face air outlet to an actual amount of air blown out from said foot air outlet.

\* \* \* \* \*